United States Patent
Ino et al.

(10) Patent No.: US 6,931,190 B2
(45) Date of Patent: Aug. 16, 2005

(54) OPTICAL FIBER UNIT FOR AIR BLOWN FIBER INSTALLATION

(75) Inventors: Etsuo Ino, Sakura (JP); Tsuyoshi Shimomichi, Sanbu-gun (JP); Keiji Ohashi, Sakura (JP)

(73) Assignee: Fujikura Ltd., Tokyo (JP)

( * ) Notice: Subject to any disclaimer, the term of this patent is extended or adjusted under 35 U.S.C. 154(b) by 142 days.

(21) Appl. No.: 10/366,406

(22) Filed: Feb. 14, 2003

(65) Prior Publication Data

US 2003/0156811 A1 Aug. 21, 2003

(30) Foreign Application Priority Data

Feb. 18, 2002 (JP) ......................................... 2002-040558
Mar. 15, 2002 (JP) ......................................... 2002-072638

(51) Int. Cl.⁷ .............................. G02B 6/02; G02B 6/22; G02B 6/44
(52) U.S. Cl. ........................ 385/128; 385/100; 385/101; 385/102; 385/103; 385/106; 385/113; 385/114; 385/126; 385/127
(58) Field of Search ................................. 385/100–103, 385/106, 109, 113–114, 126–128

(56) References Cited

U.S. PATENT DOCUMENTS

| 4,990,033 A | 2/1991 | Handley et al. |
|---|---|---|
| 4,997,256 A | 3/1991 | Sano et al. |
| 5,121,901 A | 6/1992 | Cassidy et al. |
| 5,555,335 A | 9/1996 | Barker et al. |
| 5,557,703 A | 9/1996 | Barker et al. |
| 6,101,304 A | 8/2000 | Quistorff et al. |
| 6,195,489 B1 * | 2/2001 | Oohashi et al. .............. 385/102 |
| 6,707,973 B2 * | 3/2004 | Witt et al. .................... 385/109 |
| 6,760,528 B2 * | 7/2004 | Simomichi et al. .......... 385/128 |
| 2003/0035635 A1 | 2/2003 | Chastain et al. |
| 2003/0099446 A1 * | 5/2003 | Witt et al. .................... 385/109 |

FOREIGN PATENT DOCUMENTS

| EP | 0 382 144 | 8/1990 |
|---|---|---|
| JP | 2-289805 | 11/1990 |

* cited by examiner

Primary Examiner—Frank G. Font
Assistant Examiner—Mary El-Shammaa
(74) Attorney, Agent, or Firm—Oblon, Spivak McClelland, Maier & Neustadt, P.C.

(57) ABSTRACT

An optical fiber unit for air blown fiber installation, including an optical fiber wire; an inner coating layer formed on an outer periphery of the optical fiber wire with a modulus of elasticity ranging from 0.98 to 196 MPa; an outer coating layer formed on an outer periphery of the inner coating layer with a modulus of elasticity ranging from 196 to 1960 MPa; and a foamed plastic layer formed on an outer periphery of the outer coating layer.

6 Claims, 2 Drawing Sheets

OPTICAL FIBER UNIT FOR AIR BLOWN FIBER INSTALLATION

BACKGROUND OF THE INVENTION

1. Field of the Invention

The present invention relates to an optical fiber unit installed in a previously laid cable conduit by use of air pressure.

2. Description of the Related Art

There has been known a so-called air blown fiber installation system. In such a system, a "pipe cable" (hereinafter, referred to as a conduit) obtained by aggregating at least one polyethylene pipe (inner diameter: about 6 mm) as a cable conduit is previously laid. An optical fiber unit was blown through the conduit by a drag force and a driving force caused by a difference of pressure of compressed air to install optical fibers, and thus a transmission channel of optical communication is constituted.

In the optical fiber unit for use in such an installation system, a coating thereof is formed of foamed resin for the purpose of reducing frictional resistance with an inner surface of the conduit or the other optical fiber unit in the conduit, buffering an external force to reduce a transmission loss of the optical fiber due to the external force, and reducing the weight of the optical fiber unit for blowing the same for a long distance.

In order to pick up an optical fiber wire from the optical fiber unit, it is necessary to strip part of the outer coating, particularly by the use of a tool.

The most general stripping method is to cut off the tip portion of the coating by the use of a cutter. However, in use of the cutter, there is a possibility of accidentally damaging a optical fiber wire.

Therefore, the Japanese Patent Laid-Open No. Hei 8-271772 publication disclosed an optical fiber unit including a first coating layer (nylon, silicone, etc.) and a second coating layer (foamed polyethylene) which are stacked on the outside of a unit core formed of jacketed optical fibers. The optical fiber unit is provided with a rip cord within the first coating layer.

Recently, an optical fiber unit applied for the air blown fiber installation system has been developed, in which an optical fiber wire is coated with ultraviolet curing resin (hereinafter, referred to as UV resin) to form an inner layer, and foamed polyethylene or the like is directly stacked on the outside of the inner layer.

However, with this optical fiber unit, a problem arises that side pressure is applied to the optical fiber wire due to shrinkage stress of the foamed polyethylene coating layer, which is involved in cooling after extrusion of the foamed polyethylene layer serving as an outer coating, and due to an external force caused by roughness of the inner surface of the foamed polyethylene coating layer, thus causing a transmission loss.

Also, as the result of giving high rigidity to the UV resin serving as an inner layer, the transmission loss is reduced. However, a problem remains that it becomes difficult to peel off the coating of the optical fiber unit to pick up the optical fiber wire for connection thereof, that is, so-called wire stripping work.

Also, when an optical fiber is laid by the air blown fiber method, for example, an optical fiber unit for air blown fiber installation as shown in FIG. 1 has been hitherto used as the optical fiber.

This optical fiber unit for air blown fiber installation includes an inner coating layer 5 made of the UV resin on the outer periphery of an optical fiber ribbon aggregate 4 having a plurality of optical fiber ribbons 3 stacked on each other. The optical fiber unit further includes an outer coating layer 6 made of foamed polyethylene or the like on the outer periphery of the inner coating layer 5. Each optical fiber ribbon 3 includes four optical fiber wires 1 aligned parallel to each other in a row and unitized in a tape form with a block coating layer 2. For the optical fiber wire 1, a single mode optical fiber wire or a graded index optical fiber wire is used. The number of optical fiber wires 1 constituting the optical fiber ribbon 3 and the number of optical fiber ribbons 3 stacked can be properly determined.

Meanwhile, as the demand for the optical fibers has increased, the optical fibers have been laid in various locations. Accordingly, the optical fiber unit for air blown fiber installation requires further improvement in air blowing properties thereof such as an increase in length in which the optical fiber unit can be blown, shortening of a period of time in which the optical fiber unit can be blown, and air blowing through a channel such as a pipe with more curves.

In the conventional optical fiber unit for air blown fiber installation as shown in FIG. 1, since the inner coating layer 5 is formed of the UV resin to be solid, the inner coating layer 5 must be heavy and the weight per unit length of the optical fiber unit becomes large. Therefore, this optical fiber unit is not excellent in the air blowing properties very much.

SUMMARY OF THE INVENTION

A first aspect of the present invention is an optical fiber unit for air blown fiber installation, including an optical fiber wire; an inner coating layer formed on an outer periphery of the optical fiber wire with a modulus of elasticity ranging from 0.98 to 196 MPa; an outer coating layer formed on an outer periphery of the inner coating layer with a modulus of elasticity ranging from 196 to 1960 MPa; and a foamed plastic layer formed on an outer periphery of the outer coating layer.

A second aspect of the present invention is an optical fiber unit for air blown fiber installation, including an optical fiber wire; a plurality of intervening cords longitudinally provided on the outer periphery of the optical fiber wire with a density of 0.90 $g/cm^3$; and a coating layer formed on the outer periphery of the plurality of intervening cords.

DETAILED DESCRIPTION OF EMBODIMENTS (First Embodiment)

Figure 2:
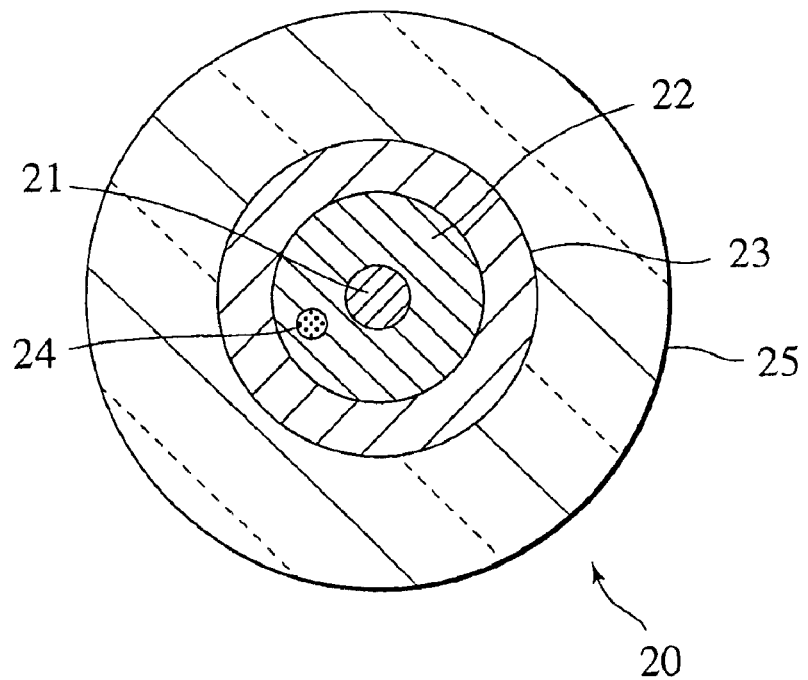
FIG. 2 is a cross-sectional view of an optical fiber unit for air blown fiber installation according to a first embodiment of the present invention.

A detailed description will be made of an optical fiber unit for air blown fiber installation according to a first embodiment of the present invention with reference to FIG. 2. As shown in FIG. 2, an optical fiber unit 20 for air blown fiber installation of the first embodiment includes an optical fiber wire 21, an inner coating layer 22 provided on an outer periphery of the optical fiber wire 21, an outer coating layer 23 provided on an outer periphery of the inner coating layer 22, and a foamed plastic coating layer 25 provided on an outer periphery of the outer coating layer 23. The optical fiber wire 21 includes a bare optical fiber with an outer diameter of 0.125 mm, which is coated with protection coating such as UV resin. Furthermore, in the vicinity of the surface of the inner coating layer 22, a rip cord 24 is buried along the longitudinal direction of the optical fiber wire 21.

Each of the inner coating layer 22 and the outer coating layer 23 is made of UV resin, thermosetting resin, thermoplastic, or the like. Preferably, however, each of the inner coating layer 22 and the outer coating layer 23 is made of UV resin for the reasons that 1) UV resin is excellent in manufacturing speed because of high reaction rate in exposure to ultraviolet rays, 2) UV resin is excellent in workability because of good processability in manufacturing, and 3) UV resin is easy to be stripped with the rip cord because of small elongation after cured.

Preferably, the modulus of elasticity (Young's modulus) of the inner coating layer 22 ranges from 0.1 to 20 kgf/mm$^2$ (0.98 to 196 MPa). When the modulus of elasticity is lower than 0.1 kgf/mm$^2$ (0.98 MPa), the rigidity of the optical fiber unit 20 becomes excessively low, and handling the optical fiber unit 20 becomes awkward. When the modulus of elasticity is higher than 20 kgf/mm$^2$ (196 MPa), stripping becomes difficult.

Preferably, the thickness of the inner coating layer 22 is 0.05 mm or more. When the thickness is less than 0.05 mm, the external force caused by shrinkage stress of the foamed plastic coating layer 25 can not be buffered, and a transmission loss properties is deteriorated.

Preferably, the modulus of elasticity of the outer coating layer 23 ranges from 20 to 200 kgf/mm$^2$ (196 to 1960 MPa). When the modulus of elasticity is lower than 20 kgf/mm$^2$ (196 MPa), the outer coating layer 23 does not have enough resistance to the side pressure or shock which may be externally applied to the optical fiber unit 20. When the modulus of elasticity is higher than 200 kgf/mm$^2$ (1960 MPa), stripping becomes difficult.

Preferably, the thickness of the outer coating layer 23 ranges from 0.01 to 1 mm. When the thickness is less than 0.01 mm, the outer coating layer 23 does not have enough resistance to the side pressure or shock which may be externally applied to the optical fiber unit 20. When the thickness is more than 1 mm, stripping becomes difficult.

The rip cord 24 buried in the vicinity of the surface of the inner coating layer 22 is composed of an aramid fiber, a steel wire, or the like.

The foamed plastic coating layer 25 is provided for the purpose of reducing the frictional resistance with the inner surface of a conduit where the optical fiber unit 20 is to be laid or another optical fiber unit existing in the conduit, buffering the external force applied to the optical fiber unit 20 to reduce the transmission loss of the optical fiber by the external force, and reducing the weight of the optical fiber unit 20. As the foamed plastic, foamed polyethylene is preferred. Preferably, the thickness of the foamed plastic coating layer 25 is 1 mm or less. When the thickness is more than 1 mm, the stripping property of the optical fiber unit 20 is deteriorated.

According to the optical fiber unit 20 of the first embodiment, the outer coating layer 23 with high modulus of elasticity buffers the shrinkage stress of the foamed plastic coating layer 25 and the external force caused by the roughness of the inner surface of the foamed plastic coating layer 25, and thus the side pressure applied to the optical fiber wire 21 is reduced. Accordingly, the transmission loss of light is reduced. With the inner coating layer 22 with low modulus of elasticity, the original rigidity of the optical fiber unit 20 can also be maintained.

According to the optical fiber unit 20 of the first embodiment, since the rip cord 24 is provided within the inner coating layer 22 with low modulus of elasticity, shearing mode fracture becomes easy to occur. Accordingly, all the coating layers of the optical fiber unit 20 can be easily torn, and a stripping tool becomes unnecessary, thus considerably shortening a connecting time of the optical fiber wire 21.

(Second Embodiment)

Figure 3:
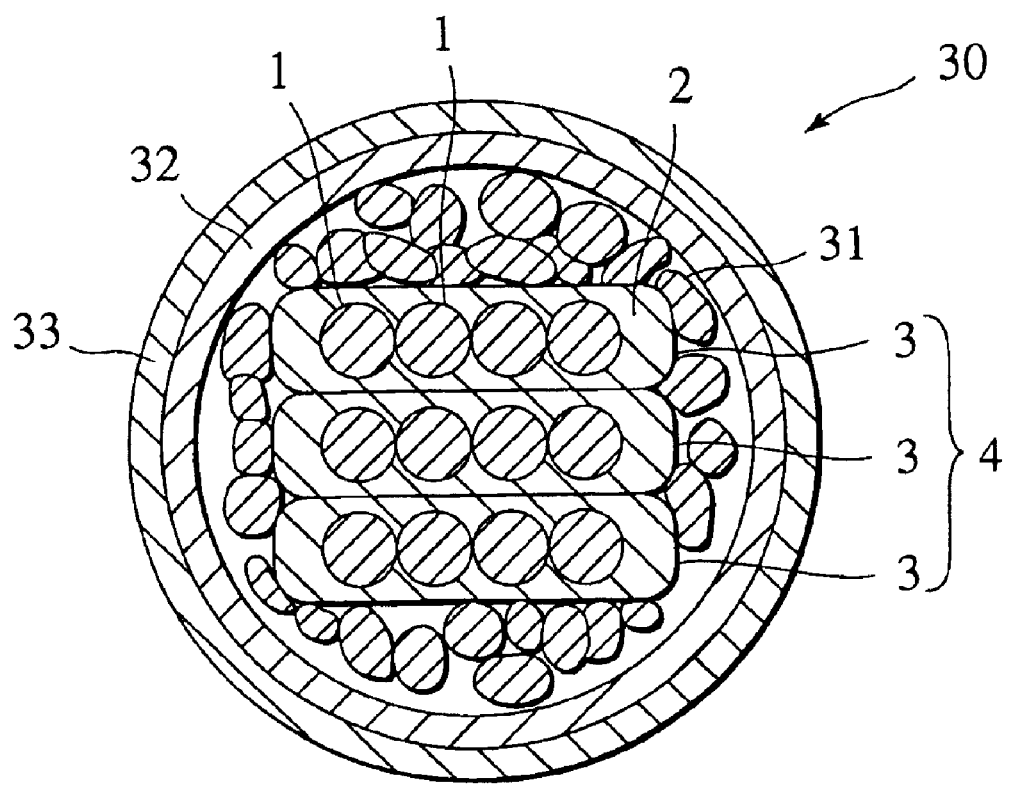
FIG. 3 is a cross-sectional view of an optical fiber unit for air blown fiber installation according to a second embodiment of the present invention.

FIG. 3 is a cross-sectional view showing an example of an optical fiber unit for air blown fiber installation according to a second embodiment of the present invention.

Figure 1:
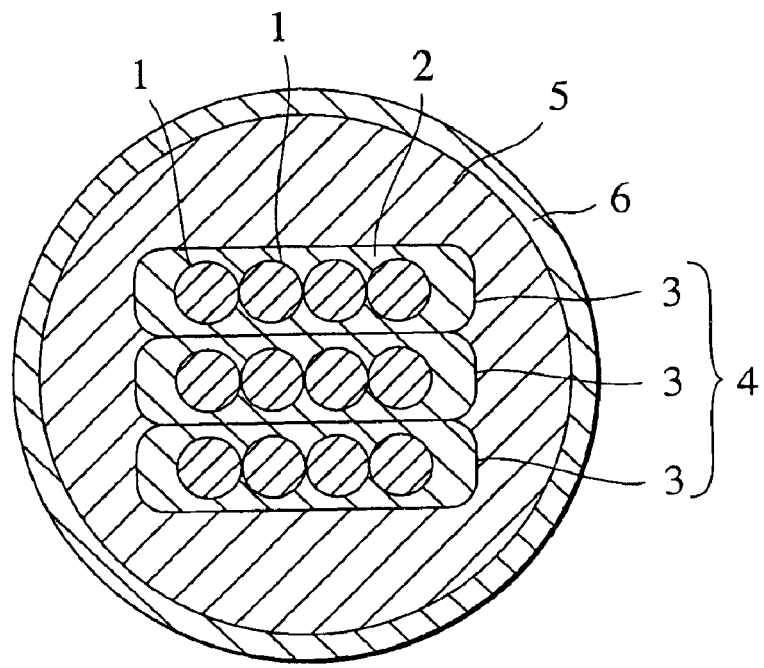
FIG. 1 is a cross-sectional view of a conventional optical fiber unit for air blown fiber installation.

Note that, in FIG. 3, members with structures similar to those of the conventional optical fiber unit for air blown fiber installation shown in FIG. 1 are given same reference numerals, and the description thereof will be simplified or omitted.

An optical fiber unit 30 for air blown fiber installation shown in FIG. 3 includes an optical fiber ribbon aggregate 4 formed by stacking the plurality of optical fiber ribbons 3, a number of intervening cords 31, an inner coating layer 32 provided on an outer periphery of the intervening cords 31, and an outer coating layer 33 provided on an outer periphery of the inner coating layer 32. The intervening cords 31 are longitudinally provided on the outer periphery of the optical fiber ribbon aggregate 4 and surround the outer periphery of the optical fiber ribbon aggregate 4.

Each of the intervening cords 31 is formed by bundling a number of cords with an outer diameter ranging from about 100 to 900 μm made of polyethylene, polyester, polyurethane, or the like.

Also, preferably, density of the intervening cords 31 is 0.90 g/cm$^3$ or lower, and more preferably, ranges about 0.10 to 0.90 g/cm$^3$. When the density of the intervening cords 31 is higher than 0.90 g/cm$^3$, weight per unit length of the optical fiber unit 30 for air blown fiber installation becomes large, and the optical fiber unit for air blown fiber installation becomes difficult to advance smoothly in the channel thereof in air pressure feeding. Accordingly, it makes it difficult to lay a long optical fiber cable by means of air blowing.

Between the respective cords constituting the intervening cords 31, airspace is provided. Moreover, the intervening cords 31 occupy about 70 to 90 vol % of space between the optical fiber ribbon aggregate 4 and the inner coating layer 32. Note that the outer diameter of the outer coating layer 33 is the same as that of the conventional outer coating layer 6.

As described above, when the airspace is provided between the respective cords constituting the intervening cords 31, and the intervening cords 31 are designed to occupy about 70 to 90 vol % of the space between the optical fiber ribbon aggregate 4 and the inner coating layer 32, bulk density of a layer between the optical fiber ribbon aggregate 4 and the inner coating layer 32, where the intervening cords 31 exist, is reduced. Then the weight per unit length of the optical fiber unit 30 for air blown fiber installation is reduced, thus improving the air blowing properties. Moreover, flexibility of the optical fiber unit 30 for air blown fiber installation is enhanced, and that allows blowing of the optical fiber unit through a channel such as a pipe with more curves.

In the space between the optical fiber ribbon aggregate 4 and the inner coating layer 32, only the intervening cords 31 exist, and the resin forming the inner coating layer 32 does not penetrate the space between the intervening cords 31. In this way, in order that the resin forming the inner coating layer 32 does not penetrate the space between the intervening cords 31, resin with high viscosity is used as the resin forming the inner coating layer 32 to make it more difficult for the resin to penetrate the space between the intervening cords 31. Moreover, the resin with high viscosity used in formation of the inner coating layer 32 is quickly cured after being applied to the outer periphery of the intervening cords 31 such that the resin does not penetrate the space between the intervening cords 31.

Therefore, the air blowing properties is not deteriorated by the increase in the bulk density of the layer between the optical fiber ribbon aggregate 4 and the inner coating layer 32, where the intervening cords 31 exist, or by the increase in the weight per unit length of the optical fiber unit 30 for air blown fiber installation. Also, since each of the intervening cords 31 is slippery on the interface (contact surface) with the inner coating layer 32, the flexibility of the optical fiber unit 30 for air blown fiber installation is enhanced. Accordingly, it becomes possible to blow the optical fiber unit through a channel such as a pipe with more curves.

Preferably, an outer diameter of the layer between the optical fiber ribbon aggregate 4 and the inner coating layer 32, where the intervening cords 31 exist, ranges from about 1.2 to 2.0 mm. When the outer diameter is more than 2.0 mm, weight per unit length of the optical fiber unit for air blown fiber installation is large, and the air blowing properties is deteriorated.

The inner coating layer 32 is made of a coating material such as ultraviolet curing resin, thermosetting resin, and the thermoplastic resin. Especially, the ultraviolet curing resin is preferably used because of high curing rate and high mechanical strength thereof. The inner coating layer 32 is formed on the outer periphery of the intervening cords 31 by an extrusion coating method or the like. Also, the thickness of the inner coating layer 32 ranges from about 100 to 500 $\mu$m. If the thickness of the inner coating layer 32 is excessively small, the optical fiber wire 1 constituting the optical fiber ribbon 3, especially the optical fiber wire 1 located in a portion having small thickness of the inner coating layer 32 becomes vulnerable to the stress by shrinkage of the outer coating layer 33 formed on the outer periphery of the inner coating layer 32 or the external stress such as stress received from a pipe inner wall when the optical fiber unit 30 is mounted in the pipe. As a result, a disadvantage arises that an increase in the transmission loss of the optical fiber wire 1 when the optical fiber unit is formed or thereabout, that is, the increase of the transmission loss by unitization becomes larger.

The outer coating layer 33 is made of UV resin, foamed resin such as foamed high-density polyethylene, or the like, and preferably, made of foamed high-density polyethylene. The outer coating layer 33 is formed on the outer periphery of the inner coating layer 32 by the extrusion coating method and the like.

The thickness of the outer coating layer 33 ranges from about 100 to 500 $\mu$m. When the thickness of the outer coating layer 33 is excessively large, the weight per unit length of the optical fiber unit 30 for air blown fiber installation becomes large, and the air blowing properties is deteriorated. Moreover, the flexibility of the optical fiber unit 30 for air blown fiber installation is lowered, which makes it difficult to blow the optical fiber unit through a channel with more curves.

In this way, in the optical fiber unit 30 for air blown fiber installation of the second embodiment, the outer periphery of the optical fiber ribbons 3 is surrounded by the intervening cords 31. The density of the intervening cords 31 is 0.90 g/cm$^3$ or lower, and the airspace is provided between the intervening cords 31. Accordingly, the weight per unit length of the optical fiber unit 30 for air blown fiber installation can be reduced, and the optical fiber unit 30 for air blown fiber installation can be easily installed in the previously laid cable pipe and the like by the air blowing.

Moreover, in the optical fiber unit 30 for air blown fiber installation of the second embodiment, since the optical fiber ribbons 3 are used as an aggregate, it is easy to handle the optical fibers, even in the case of aggregating a number of optical fibers. Thus high density can be preferably achieved.

Note that, in the optical fiber unit 30 for air blown fiber installation of the second embodiment, the optical fiber ribbon 3 is used as an optical fiber, but the optical fiber unit for air blown fiber installation of the present invention is not limited to this. The optical fiber may be any of a bare optical fiber, an optical fiber wire, a single optical fiber cable, an optical fiber ribbon, or the like and may be composed of either a single thereof or a plurality thereof.

CROSS REFERENCES TO RELATED APPLICATIONS

This application is based upon and claims the benefit of priorities from prior Japanese Patent Applications P2002-040558 filed on Feb. 18, 2002 and P2002-072638 filed on Mar. 15, 2002; the entire contents of which are incorporated by reference herein.

What is claimed is:

1. An optical fiber unit for air blown fiber installation, comprising:
   an optical fiber wire;
   an inner coating layer formed on an outer periphery of the optical fiber wire with a modulus of elasticity ranging from 0.98 to 196 MPa;
   an outer coating layer formed on an outer periphery of the inner coating layer with a modulus of elasticity ranging from 196 to 1960 MPa; and
   a foamed plastic layer formed on an outer periphery of the outer coating layer.

2. The optical fiber unit for air blown fiber installation of claim 1, wherein each of the inner coating layer and the outer coating layer is made of ultraviolet curing resin.

3. The optical fiber unit for air blown fiber installation of claim 1, wherein the inner coating layer has a thickness of 0.05 mm or more, the outer coating layer has a thickness of 0.01 mm or more but not exceeding 1 mm, and the foamed plastic layer has a thickness of 1 mm or less.

4. The optical fiber unit for air blown fiber installation of claim 1, wherein a rip cord is longitudinally provided in the inner coating layer.

5. An optical fiber unit for air blown fiber installation, comprising:
   an optical fiber wire;
   a plurality of intervening cords longitudinally provided on the outer periphery of the optical fiber wire with a density of 0.90 g/cm$^3$; and
   a coating layer formed on the outer periphery of the plurality of intervening cords, wherein an air space is provided between the intervening cords.

6. The optical fiber unit for air blown fiber installation of claim 5, further comprising: a second coating layer provided on the outer periphery of the coating layer, wherein the coating layer and second coating layer do not penetrate the space between the intervening cords.

* * * * *